J. M. SACKMAN.
ANIMAL-TRAPS.
No. 195,774. Patented Oct. 2, 1877.
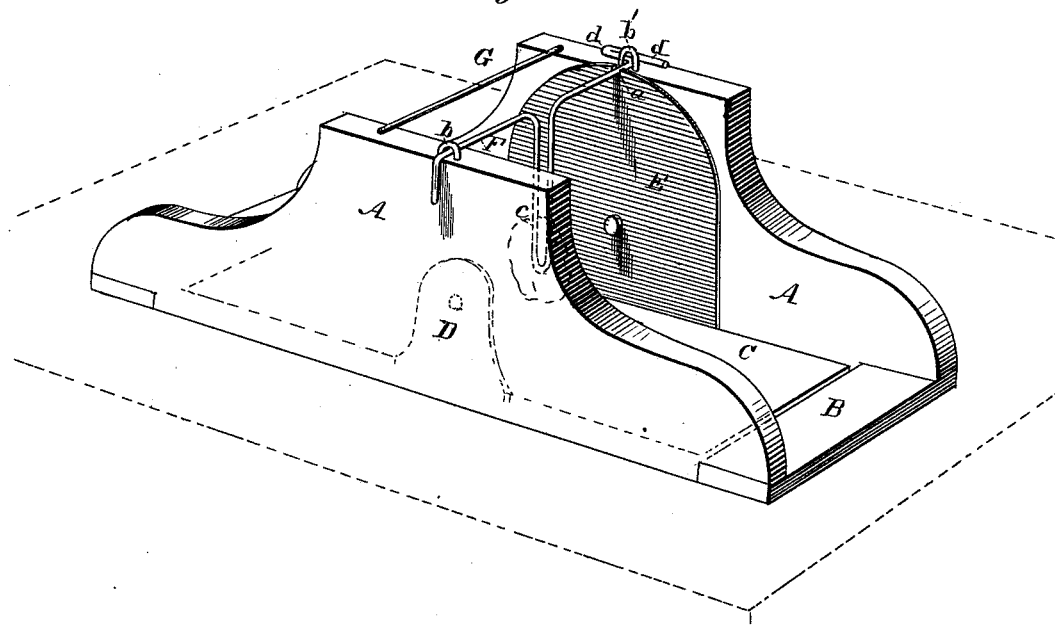
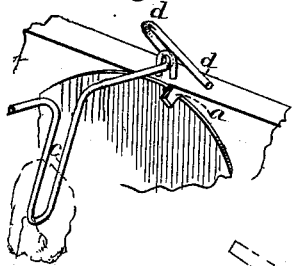
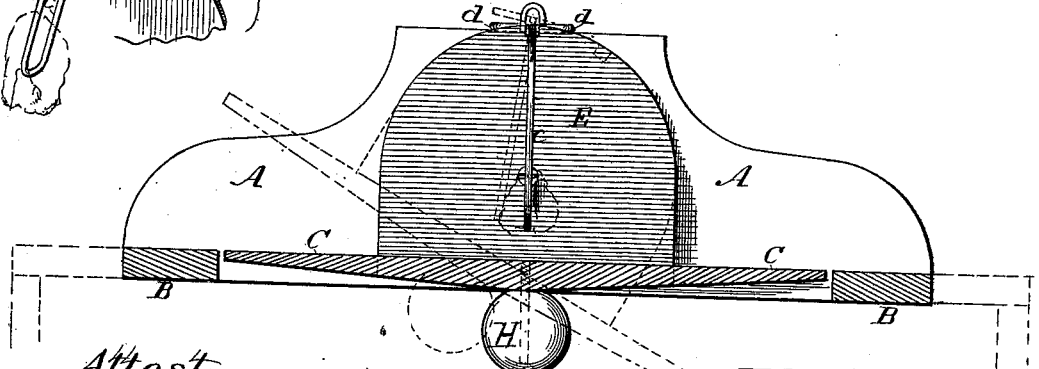
Attest:
J. M. Sackman,
Inventor.

UNITED STATES PATENT OFFICE.

JOHN M. SACKMAN, OF RIDGEVILLE, INDIANA, ASSIGNOR TO HIMSELF AND JOHN K. HAMMERLE, OF SAME PLACE.

IMPROVEMENT IN ANIMAL-TRAPS.

Specification forming part of Letters Patent No. 195,774, dated October 2, 1877; application filed August 9, 1877.

*To all whom it may concern:*

Be it known that I, JOHN M. SACKMAN, of Ridgeville, in the county of Randolph and State of Indiana, have invented certain new and useful Improvements in Animal Traps; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to self-setting gravitating-platform traps; its object being to provide a self-setting trap of great simplicity and cheapness of structure, which shall be certain in its operation; and the invention consists in a swinging or oscillating platform hung centrally of its length, which admits the animal at either end, and discharges him into a receptacle below, said platform being held in place during the approach of the animal, and released to discharge him, by direct action of the bait-carrying wire, as hereinafter described.

Figure 1 is a perspective view of my improved trap when set, with the receptacle underneath shown in dotted lines. Fig. 2 is a longitudinal section of the trap, showing it when set, and also, by dotted lines, when swung to discharge the animal. Fig. 3 is a perspective view of a section of the trap, showing more clearly the means for holding and releasing the platform.

The same letters of reference are used in all the figures in the designation of identical parts.

A A are two upright cheeks or brackets, forming the sides of the trap, being connected together by means of cross-pieces B B mortised into their under edges at either end, respectively. C is an oscillating or swinging platform, hung centrally of its length, between the brackets A A, by means of pendulous supports D E attached to the platform, and pivoted, respectively, to the sides of the brackets. The support E is a semicircular plate, the circumference of which projects slightly above the bracket, to which it is hung. A notch, $a$, is cut in the rim of the plate. F is a wire, which extends across over the platform between the brackets, resting upon the top of the latter, where it is held in place by staples $b\ b'$. This wire is bent into a loop, $c$, which projects downward midway between the brackets, and carries the bait. One end of said wire, after it projects through the staple $b$, is bent at right angles, the bent end projecting down over the edge of the bracket to prevent the wire from sliding out of place. The other end of wire F, immediately after passing through staple $b'$, is bent at right angles, and turned upon itself, the return end reaching back and passing the staple, such bending forming arms $d$, projecting in reverse directions in T form from either side of staple $b'$, and resting upon the top of the bracket. G is a wire which spans between the brackets, and acts as a stay, having its bent ends inserted into the tops thereof.

When the trap is set, the wire F rests in the notch $a$ of the semicircular rotating plate E, and while the rat or other animal approaches the bait in the loop C from either end of the platform said platform remains firm; but as soon as the bait is disturbed or touched, the loop swings, whereby the wire is lifted out of the notch by the action of one of the arms $d$, and the platform is released. The weight of the animal causes the end on which he stands to fall, whereby he is dumped into the receptacle below.

As soon as the animal is discharged, the platform, of its own gravity, swings back, the wire F being supported upon the circumference of the rotating plate E until the platform reaches its normal position, when, the notch $a$ being brought under the wire, the latter falls therein, performing the part of a latch, and the trap is reset.

A balance-bob, H, may be attached to the under side of the swinging platform to enable it more readily to regain its normal position.

The staple $b'$ is not driven close upon the wire, but so as to leave a space for the wire to rise and fall.

My trap exhibits remarkable simplicity of structure, and is adapted to the catching of various-sized animals, from the smallest to the largest.

What I claim as my invention is—

1. In an animal-trap, a bait-carrying wire having a bait-loop projecting at right angles thereto, said wire being provided with arms projecting in opposite directions, also at right angles to the length of the wire, whereby the swinging of the bait-loop in either direction raises one end of the wire upon one of said arms, and releases the trap, substantially as described.

2. In an animal-trap, the combination of an oscillating platform, a semicircular plate attached thereto, which turns in an arc of a circle with the oscillation of the platform, said plate being provided with a notch in its rim, and a latch which rests upon said rim during the oscillation of the platform, and falls into said notch to hold the trap set, when the platform reaches a horizontal position, substantially as described.

3. The combination of an oscillating platform, a semicircular plate attached thereto, and turning therewith, provided with a notch in its rim, and a bait-carrying wire provided with a downwardly-projecting bait-loop, and with arms projecting at right angles at one end, whereby the trap may be released by the direct action of the bait-carrying wire without intermediate levers, substantially as described.

In testimony that I claim the foregoing as my own I affix my signature in presence of two witnesses.

JOHN M. SACKMAN.

Witnesses:
D. W. PORTER,
LEVI JAMES.